UNITED STATES PATENT OFFICE.

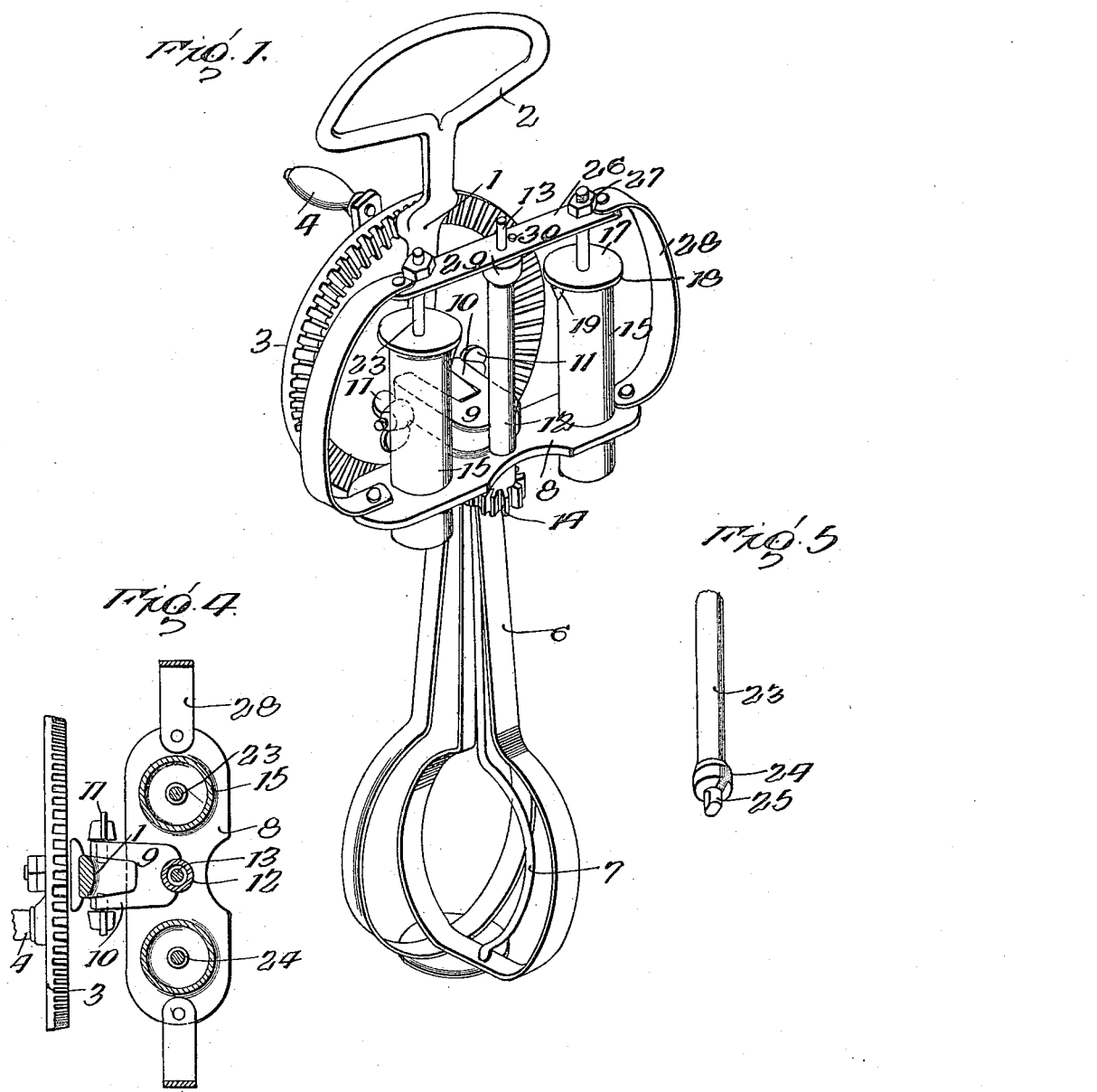

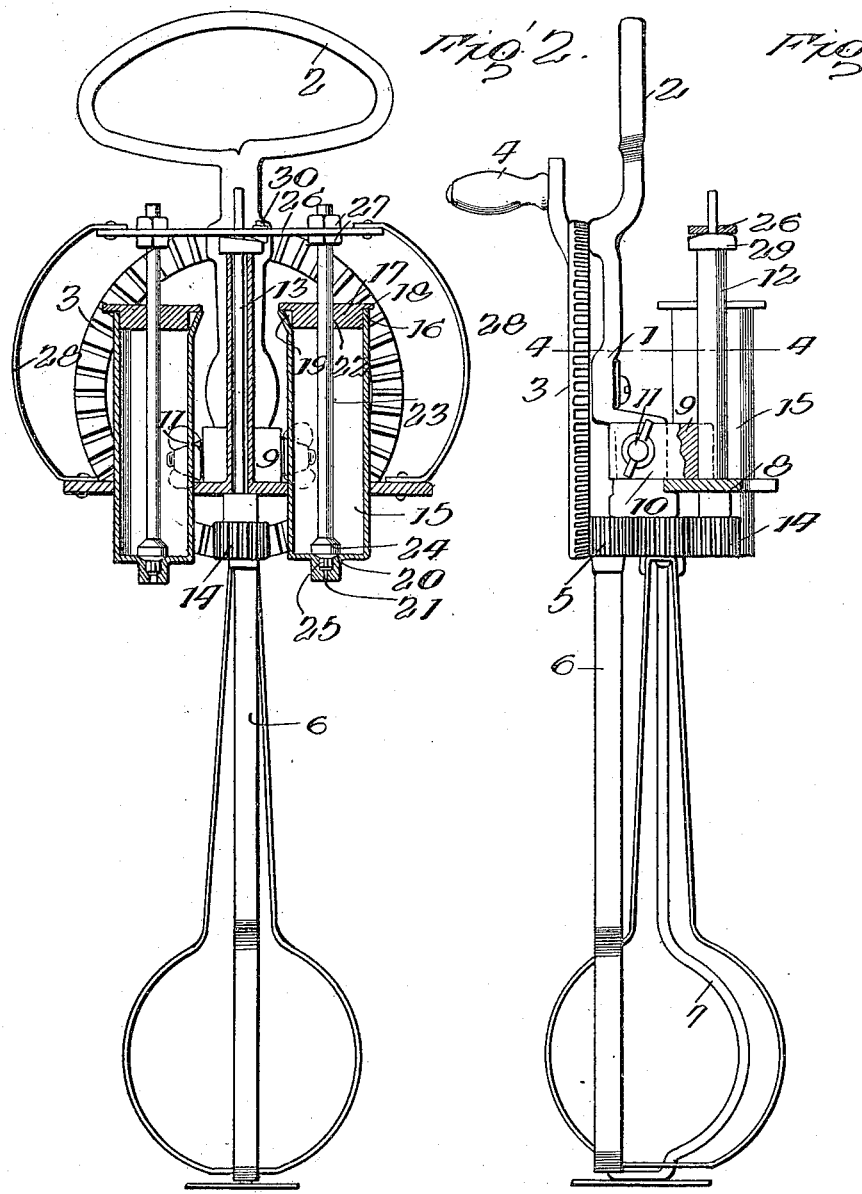

GUY W. KELLY, OF MARCELINE, MISSOURI, ASSIGNOR OF ONE-HALF TO CLAUD BUCHANON, OF MARCELINE, MISSOURI.

DEVICE FOR USE IN THE PREPARATION OF MAYONNAISE DRESSING.

1,220,426.  Specification of Letters Patent.  Patented Mar. 27, 1917.

Application filed August 10, 1915, Serial No. 44,820. Renewed August 21, 1916. Serial No. 116,187.

*To all whom it may concern:*

Be it known that I, GUY W. KELLY, a citizen of the United States, residing at Marceline, in the county of Linn and State of Missouri, have invented certain new and useful Improvements in Devices for Use in the Preparation of Mayonnaise Dressing, of which the following is a specification.

This invention relates to devices for use in the preparation of mayonnaise and similar dressings and has as one of its objects to provide a device of this class in the nature of an attachment which may be readily applied to and removed from any of the well known types of rotary egg beaters so that by the application of the device to the beater means is provided for automatically supplying the proper quantities of olive oil and vinegar to the mixture being stirred by the beater.

Another aim of the invention is to provide a device of this class so constructed that it may be readily and conveniently cleaned and readily applied to and removed from the frame of an egg beater so that the beater may be employed independently of the device whenever desired.

Another aim of the invention is to provide a device of this class so constructed that when applied to an egg beater it will be adapted for actuation directly from the gearing of the egg beater and consequently the vinegar and olive oil will be supplied to the mixture only at such time as the egg beater itself is being operated and the mixture is being stirred.

In the accompanying drawings:

Figure 1 is a perspective view of the device embodying the present invention applied to an egg beater;

Fig. 2 is a vertical transverse sectional view through the device;

Fig. 3 is a side elevation thereof, parts being shown in section;

Fig. 4 is a horizontal sectional view on the line 4—4 of Fig. 3;

Fig. 5 is a perspective view of the lower portion of one of the valves of the device.

Corresponding and like parts are referred to in the following description and indicated in all the views of the accompanying drawings by the same reference characters.

In the drawings the numeral 1 indicates the frame of a well-known form of egg beater which frame is provided with the usual handle 2 at its upper end, and mounted upon this frame is the usual gear 3 rotated through the medium of a small crank handle 4 which is carried thereby. The gear 3 meshes with and drives one of a pair of pinions 5 carried at the upper ends of the rotary beaters 6 which beaters are supported at their lower ends in the usual manner and in the usual frame 7.

The device embodying the present invention includes a relatively stationary base plate 8 having secured thereto or integral therewith a boss 9 having a recess 10 adapted to receive the lower end portion of the frame 1 in the manner clearly shown in Figs. 1 and 4 of the drawings. Clamping screws 11 are threaded through the opposite walls of the recess 10 and may be tightened to bear against the opposite sides of the said portion of the frame 1 whereby to secure the device or attachment removably to the frame of the egg beater. Upstanding from the base plate 8 is a sleeve bearing 12 in which is rotatably mounted a shaft 13 and fixed upon the lower end of this shaft and below the base plate 8 is a pinion 14 which, when the device is attached to the frame of the egg beater, meshes with that one of the pinions 5 other than the one which is in mesh with the gear 3. The sleeve bearing 12 is preferably mounted midway between the ends of the base plate 8 and secured in openings in the said base plate at opposite sides of the said sleeve bearing are containers 15 into which may be introduced the vinegar and olive oil to be employed in the preparation of the dressing. The containers 15 are here shown as cylindrical in form and each is open at its upper end as indicated at 16 and normally closed by means of a cap 17 having a flange 18 which rests upon the upper edge of the wall of the respective container when the body portion of the cap is fitted within the mouth of the container. In order that the contents of the containers may be readily drained therefrom each container is provided with a small spout 19 located at its mouth and the flanges 18 are of such width as to cover these spouts when the closure caps are in place.

Each of the containers is provided in its bottom with a valve seat 20 and an outlet opening 21 and slidably fitted for reciprocatory motion through an opening 22 in the cap closure of each container is a valve stem 23 enlarged near its lower end to form a valve head 24 for coöperation with the respective valve seat 20. The stem of the valve below the head 24 is flattened at intervals in its circumference as indicated at 25 so that as the valve is lifted from its seat to permit of the escape of a suitable quantity of the contents of the container the stem will be guided and yet the contents may flow past the lower end of the said stem. The valve stems 23 are connected at their upper ends by means of a cross bar 26 through which their said upper ends are fitted, nuts 27 being threaded upon each valve stem below and above the cross bar 26 and being tightened to bear against the said bar. In order that the valve stems may be normally yieldably held in a downward position so as to close both valves bowed leaf springs 28 are secured at their lower ends one to each end of the base plate 8 and at their upper ends to the opposite ends of the cross bar 26 and it will be apparent by reference to the drawings that upward movement of the cross bar 26 for the purpose of opening the valves 24 will be against the tension of the said springs 28.

In order that the valve stems may be reciprocated a cam 29 is fixed upon the shaft 13 immediately above the upper end of the sleeve bearing 12 and below the cross bar 26, the upper face of the cam being the working face thereof and the said cross bar being provided with an abutment 30 for coöperation with the said face of the cam.

From the foregoing description of the invention it will be understood that as the crank handle 4 is turned so as to operate the egg beater, rotary motion will be imparted to the shaft 13 and consequently to the cam 29 and as this cam rotates it will ride against the abutment 30 and an up and down motion will be imparted to the cross bar 26 thereby reciprocating the valve stems 23 against the tension of the springs 28 and alternately opening and closing the valves 24. Thus as the mixture is stirred by the beaters 6, the proper quantities of olive oil and vinegar will be supplied to the mixture, the openings 21 from the containers being so proportioned that the said ingredients will be supplied in the proper relative quantities.

Having thus described the invention, what is claimed as new is:

1. In a device of the class described, relatively fixed containers each having an outlet, a valve controlling the outlet from each container, reciprocatory stems connected to the valves, yieldable means connected to the stems and normally tending to close the valves, a connection between the said valve stems, and a rotary cam element coöperating with the said connection whereby the valve stems may be reciprocated.

2. In a device of the class described, relatively fixed containers each having an outlet, a valve controlling the outlet from each container, reciprocatory stems connected to the valves, a connection between the said valve stems, a rotary shaft, a cam carried by the shaft and coöperating with the said connection for reciprocating the valve stems, and a spring connected to said connection between the valve stems and normally yieldably holding the stems with the valves in closed position.

3. In a device of the class described, relatively fixed containers each having an outlet, a valve controlling the outlet from each container, reciprocatory stems connected to the valves, a relatively fixed element supporting the said containers, a connection between the said valve stems, bowed springs connected to the said fixed element and to the said connection between the valve stems and normally yieldably holding the stems with the valves in closed position, and a rotary cam element coöperating with the said connection whereby the valve stems may be reciprocated.

4. In a device of the class described, a relatively fixed support provided with an attaching means whereby it may be connected to a fixed portion of a mixing device, spaced containers carried by the said support, each of the said containers having an outlet, a valve controlling the outlet from each container, a shaft rotatably mounted upon the said support and carrying a gear element for coöperation with a gear element of the said mixing device, a cross bar connecting the stems for the said valves, an abutment carried by the said member, a cam fixed upon the said shaft and coöperating with the abutment, and springs connected to the said connection between the stems and to the said support and normally tending to move the stems to position to close the said valves.

5. In a device of the class described, a relatively fixed support designed for attachment to a mixing device, containers mounted upon the support and each having an outlet, a valve working in each of said containers and arranged to control the flow of liquid from the container through the outlet therein, a bar extending between the stems of the said valves and connecting the same, a rotary shaft journaled in the support, an abutment upon the bar, a cam upon the shaft arranged to coöperate with the said abutment whereby to impart vertical reciprocatory movement to the bar upon rotation of the shaft, and means yieldably holding the bar in a downward direction.

6. The combination with a mixing device including a frame, a rotary mixer mounted upon the frame, a drive gear mounted for rotation upon the frame, gear connection between the gear and the mixer for rotating the latter when the gear is rotated, a support mounted upon the frame, containers mounted upon the support and each having an outlet, a valve working in each of said containers and arranged to control the flow of liquid therefrom through the respective outlets, a shaft mounted for rotation upon the support, gear connection between the shaft and the first-mentioned gear, connection between the stems of the said valves, and means carried by the said shaft and arranged in the rotary motion thereof to coöperate with the connections to impart vertical reciprocatory motion thereto and through the medium thereof to the said valve stems.

In testimony whereof I affix my signature.

GUY W. KELLY. [L. S.]

Copies of this patent may be obtained for five cents each, by addressing the "Commissioner of Patents, Washington, D. C."